(12) United States Patent
Lothe et al.

(10) Patent No.: US 12,372,018 B2
(45) Date of Patent: Jul. 29, 2025

(54) HYDROCARBON PRODUCTION SYSTEM WITH REDUCED CARBON DIOXIDE EMISSION

(71) Applicant: EQUINOR ENERGY AS, Stavanager (NO)

(72) Inventors: Per Lothe, Førresfjorden (NO); Arild Samuelsberg, Hauggesund (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 18/710,678

(22) PCT Filed: Nov. 17, 2022

(86) PCT No.: PCT/NO2022/050265
§ 371 (c)(1),
(2) Date: May 16, 2024

(87) PCT Pub. No.: WO2023/091025
PCT Pub. Date: May 25, 2023

(65) Prior Publication Data
US 2025/0012209 A1    Jan. 9, 2025

(30) Foreign Application Priority Data
Nov. 17, 2021    (GB) .................................. 2116595

(51) Int. Cl.
*F02C 3/00*    (2006.01)
*B01D 53/14*    (2006.01)
(Continued)

(52) U.S. Cl.
CPC ....... *F01N 3/0857* (2013.01); *B01D 53/1425* (2013.01); *B01D 53/1475* (2013.01);
(Continued)

(58) Field of Classification Search
CPC .............. F01N 3/0857; B01D 53/1425; B01D 53/1475; B01D 53/18; B01D 53/62;
(Continued)

(56) References Cited

U.S. PATENT DOCUMENTS 2,088,060 A * 7/1937 Hiller ........................ F17C 5/02
62/54.2
5,832,712 A    11/1998 Rønning et al.
(Continued)

FOREIGN PATENT DOCUMENTS

CN    203793370 U    8/2014
CN    211140118 U    7/2020
(Continued)

OTHER PUBLICATIONS

International Search Report and Written Opinion, PCT/NO2022/050265, dated Feb. 15, 2023 (11 pp.).
(Continued)

*Primary Examiner* — Steven M Sutherland
(74) *Attorney, Agent, or Firm* — Eversheds Sutherland (US) LLP

(57) ABSTRACT

A method of operating a hydrocarbon production system. The hydrocarbon production system including a gas turbine engine configured to combust hydrocarbon gas produced at the hydrocarbon production system and to provide power for the hydrocarbon production system as a result of the combustion. The method includes combusting produced hydrocarbon gas in the gas turbine engine, capturing carbon dioxide exhausted from the gas turbine engine as a result of the combustion of the hydrocarbon gas, storing the captured carbon dioxide at the hydrocarbon production system in a first set of storage pipes, and transporting the stored carbon dioxide away from the hydrocarbon production system for permanent storage.

22 Claims, 2 Drawing Sheets

(51) Int. Cl.
  *B01D 53/18* (2006.01)
  *B01D 53/62* (2006.01)
  *B01D 53/78* (2006.01)
  *B01D 53/96* (2006.01)
  *F01N 3/08* (2006.01)
  *F17C 5/02* (2006.01)

(52) U.S. Cl.
  CPC ............ *B01D 53/18* (2013.01); *B01D 53/62* (2013.01); *B01D 53/78* (2013.01); *B01D 53/96* (2013.01); *F02C 3/00* (2013.01); *F17C 5/02* (2013.01); *B01D 2252/204* (2013.01); *B01D 2257/504* (2013.01); *F17C 2201/0104* (2013.01); *F17C 2205/013* (2013.01); *F17C 2221/013* (2013.01); *F17C 2223/0123* (2013.01); *F17C 2225/013* (2013.01); *F17C 2270/0118* (2013.01); *F17C 2270/0168* (2013.01)

(58) Field of Classification Search
  CPC .. B01D 53/78; B01D 53/96; B01D 2252/204; B01D 2257/504; F02C 3/00; F17C 5/02; F17C 2201/0104; F17C 2205/013; F17C 2221/013; F17C 2223/0123; F17C 2225/013; F17C 2270/0118; F17C 2270/0168
  See application file for complete search history.

(56) References Cited

U.S. PATENT DOCUMENTS

| | | |
|---|---|---|
| 2008/0210092 A1 | 9/2008 | Buckles et al. |
| 2014/0137780 A1 | 5/2014 | Boulet |
| 2016/0059180 A1 | 3/2016 | Humad |
| 2017/0218727 A1 | 8/2017 | Oehring et al. |
| 2020/0338470 A1 | 10/2020 | Fourati et al. |

FOREIGN PATENT DOCUMENTS

| | | |
|---|---|---|
| EP | 2246531 A1 | 11/2010 |
| EP | 2368022 A2 | 9/2011 |
| KR | 20110072810 A | 6/2011 |
| KR | 20210007791 A | 1/2021 |
| WO | 2007012143 A1 | 2/2007 |
| WO | 2021151443 A1 | 8/2021 |

OTHER PUBLICATIONS

Combined Search and Examination Report, GB2116595.6, dated Apr. 28, 2022 (6 pp.).

D'Amore, Federico, et al., "Optimal design of European supply chains for carbon capture and storage from industrial emission sources including pipe and ship transport", International Journal of Greenhouse Gas Control 109 (2021), www.elsevier.com/locate/ijggc (16 pp.).

* cited by examiner

HYDROCARBON PRODUCTION SYSTEM WITH REDUCED CARBON DIOXIDE EMISSION

TECHNICAL FIELD

The present invention relates to a method of operating a hydrocarbon production system with reduced carbon dioxide ($CO_2$) emission. The invention further extends to a corresponding hydrocarbon production system, to a combination comprising said hydrocarbon production system, and to a method of retrofitting an existing hydrocarbon production system for conformity with the hydrocarbon production system of the invention.

BACKGROUND OF THE INVENTION

Hydrocarbon production systems, and in particular offshore hydrocarbon production facilities, often comprise one or more gas turbine engines (GTE) for local power generation at the production system. A portion of the hydrocarbon gases produced may be combusted in the GTE to produce power for the operation of the production system. The exhaust gases produced from the combustion, comprising a significant portion of carbon dioxide, are vented to the atmosphere.

The significant detrimental impacts that carbon dioxide emission has on the environment are notoriously well-known. There is therefore a general desire, where possible, to reduce carbon dioxide emission to the environment and, as time goes on, this desire only grows. The regulations surrounding operation of hydrocarbon production systems reflects this growing desire, with mandates on the reduction of the 'carbon footprint' for such systems being introduced by the various regulatory bodies.

One known method of operating a hydrocarbon production system with a reduced emission of carbon dioxide to the environment is disclosed in, e.g., U.S. Pat. No. 5,832,712. In this document, the carbon dioxide exhausted from a GTE situated at an offshore hydrocarbon production facility is captured in an absorption liquid using an absorption column. The absorption liquid is then passed to a stripping column where the carbon dioxide is stripped from the absorption liquid to form carbon dioxide gas. Various options for the carbon dioxide gas once stripped are disclosed. In a first alternative, it is disclosed that the carbon dioxide gas can be disposed of at sea through its absorption in sea water. In a second alternative, it is disclosed that the carbon dioxide gas may be compressed and then injected into a petroleum reservoir (to enhance recovery rates) or into a depleted reservoir for permanent storage.

There is a general desire for alternative and improved methods of operation of hydrocarbon systems with reduced carbon dioxide emission.

SUMMARY OF THE INVENTION

In accordance with a first aspect of the invention, there is provided a method of operating a hydrocarbon production system, the hydrocarbon production system comprising a gas turbine engine configured to combust hydrocarbon gas produced at the hydrocarbon production system and to provide power for the hydrocarbon production system as a result of the combustion, the method comprising: combusting produced hydrocarbon gas in the gas turbine engine; capturing carbon dioxide exhausted from the gas turbine engine as a result of the combustion of the hydrocarbon gas; storing the captured carbon dioxide at the hydrocarbon production system in a first set of storage pipes; and transporting the stored carbon dioxide away from the hydrocarbon production system for permanent storage.

The invention of the first aspect significantly reduces the amount of carbon dioxide that would otherwise be emitted to the environment through operation of the hydrocarbon production system since the carbon dioxide is stored locally in the first set of storage pipes and subsequently transported for further permanent storage. As such, emission of carbon dioxide to the atmosphere (and the detrimental environmental impacts associated therewith) through operation of the hydrocarbon production system is reduced and may in fact be totally avoided (i.e. the method of the first aspect of the invention can result in operation of the hydrocarbon production system with net-zero carbon dioxide emissions).

Whilst the prior art methods of operation of hydrocarbon production systems, in particular offshore hydrocarbon production facilities as disclosed in, for example, U.S. Pat. No. 5,832,712 also permit a reduction in carbon dioxide emissions, they are neither as feasible nor as sustainable as the method of the first aspect of the invention. For instance, each method disclosed in U.S. Pat. No. 5,832,712 requires that the carbon dioxide gas captured from the exhaust of the gas turbine engine is dealt with immediately and locally to the production system through disposal at sea or through injection into a petroleum or depleted reservoir. None of these options are considered to be particularly feasible long-term solutions to dealing with the carbon dioxide produced. For example, only a limited degree of carbon dioxide can be injected into a depleted reservoir before it is full or into a producing reservoir before it becomes commercially non-viable to do so. As such, these present only time-limited solutions for dealing with the carbon dioxide produced. Disposal at sea is also not an environmentally sound method of dealing with the carbon dioxide given that a large portion of this would eventually escape to the atmosphere and the dissolution of carbon dioxide in seawater contributes to ocean acidification. As such, the stricter regulations both in force and coming into force steer away from this method of dealing with carbon dioxide.

In contrast, the method of the first aspect requires that the carbon dioxide which is captured is stored locally at the hydrocarbon production system in the first set of storage pipes and then collected for transport for permanent storage at a storage facility away from the hydrocarbon production system. The storage at the hydrocarbon production system permits the captured carbon dioxide to be handled in the short term (i.e. temporarily) whilst avoiding emission to the environment and this avoids the need for immediate disposal as in the prior art methods discussed above. Subsequent to this, the transportation from the production system and to a more permanent storage enables the carbon dioxide to be dealt with permanently without its emission to the environment. Thus, the method of the first aspect provides a more long lived and sustainable solution to the carbon dioxide produced at the hydrocarbon production system as compared to the prior art methods discussed above.

The method of the first aspect requires use of storage pipes, which are particularly advantageous in the context of the invention since they are associated with a significantly lower capital and operational expenditure as compared to, e.g., conventional tank storage (i.e. vessel storage) for storing carbon dioxide, particularly in the optional context of storing liquid carbon dioxide at elevated pressures and ambient temperature conditions as discussed in further detail below.

Typical 'tank' type storage solutions require thick steel walled tanks. These tanks are expensive to provide (given the large amount of material typically required), and are also expensive to transport given their weight (again, given the large amount of material required). The requisite wall thickness (and hence weight of the tank) also limits the size of the tank that can be used, meaning that the volume of carbon dioxide stored therein is limited.

In contrast, pipe storage is relatively inexpensive to provide because standard, 'off'-the-shelf pipes may be used to manufacture them. Moreover, for a given volume of storage, pipe storage can have a comparatively smaller wall thickness. Thus, a given volume of carbon dioxide can be stored using a comparatively lower total weight of storage tank material using pipe storage and can be achieved at a lower capital expenditure. Thus, pipe storage is a more viable solution.

As will be appreciated, the step of storing the captured carbon dioxide at the hydrocarbon production system in the first set of storage pipes may comprise temporarily storing the captured carbon dioxide in the first set of storage pipes. That is, the first set of storage of pipes may act as a temporary or interim store for the captured carbon dioxide.

As alluded to above, the hydrocarbon production system may be or comprise an offshore hydrocarbon production facility. The hydrocarbon production facility may be a hydrocarbon production platform, e.g. an unmanned hydrocarbon production platform.

The hydrocarbon production system may be a land-based hydrocarbon production system.

It will be understood by the skilled person that a hydrocarbon production system is a system that is specifically configured for the production and/or processing of hydrocarbons (e.g. oil, natural gas, etc.). As such, the hydrocarbon production system will comprise a degree of production equipment for producing hydrocarbon and, optionally, a degree of processing equipment configured for processing or part-processing the produced hydrocarbons.

Transporting the stored carbon dioxide away from the hydrocarbon production system for permanent storage may comprise transporting the carbon dioxide to a land-based storage facility. Optionally, where the hydrocarbon production system is offshore, transporting the stored carbon dioxide away from the hydrocarbon production system may comprise use of a vessel and/or a tanker.

The gas turbine engine may be used to produce electrical power for the hydrocarbon production system as a result of the combustion. This may entail use of an electrical generator connected to the gas turbine engine. The gas turbine engine may additionally and/or alternatively may be configured to provide direct power to components of the hydrocarbon production system, e.g. to provide a direct drive to a compressor of the hydrocarbon production system.

The hydrocarbon production system may comprise a plurality of gas turbine engines. Each gas turbine engine may be configured to combust hydrocarbon gas produced at the hydrocarbon production system and to provide power for the hydrocarbon production system as a result of the combustion. The method may comprise: combusting produced hydrocarbon gas in some or each of the gas turbine engines; capturing carbon dioxide exhausted from some or each of the gas turbine engines as a result of the combustion of the hydrocarbon gas; storing the captured carbon dioxide at the hydrocarbon production system in the first set of storage pipes; and transporting the stored carbon dioxide away from the hydrocarbon production system for permanent storage.

Transporting the stored carbon dioxide away from the hydrocarbon production system for permanent storage may comprise transporting the carbon dioxide to a permanent store.

The method may comprise the step of permanently storing the carbon dioxide in a permanent store. This step may occur after the step of transporting the stored carbon dioxide.

The permanent store may be a man-made/artificial storage facility—i.e. not a naturally occurring storage facility.

The permanent store may comprise a geological formation. Thus, the carbon dioxide may be considered to be geologically sequestered once permanently stored.

The permanent store may comprise a mineral storage of the carbon dioxide. The mineral storage may be realised through reaction of the carbon dioxide that has been captured and transported with metal oxides to form carbonates (i.e. minerals).

The method may comprise the step of liquefying the captured carbon dioxide. This liquefying step may occur as a part of (i.e. comprised within) the capturing step of the method or may occur as a sequential step occurring after the carbon dioxide has been captured. Storing the captured carbon dioxide at the hydrocarbon production system in the first set of storage pipes may comprise storing the carbon dioxide as a liquid. Transporting the stored carbon dioxide away from the hydrocarbon production system for permanent storage may comprise transporting the carbon dioxide as a liquid.

Optionally, liquefying the captured carbon dioxide comprises liquefying the captured carbon dioxide at ambient temperature conditions. The method may comprise storing and/or transporting the captured carbon dioxide as a liquid at ambient temperature conditions. The skilled person will appreciate that liquefying carbon dioxide at ambient temperature conditions and equally storing and transporting carbon dioxide as a liquid at ambient temperature conditions requires the carbon dioxide to be pressurised at pressures far above ambient pressure conditions with the exact pressure conditions being determined by the specific ambient temperature at which the carbon dioxide is stored.

Conventionally, liquefaction of carbon dioxide, and transportation and storage of carbon dioxide as a liquid is carried out at ambient pressure conditions and hence, as will be understood by the skilled person, at very cold temperature conditions (e.g. cryogenic temperatures) that are significantly below ambient temperature conditions. In the context of the invention however, in particular in the context of offshore hydrocarbon production systems, whilst possible, it is less advantageous to liquefy, store and/or transport carbon dioxide at temperature conditions significantly below ambient temperature conditions. This is because there is significant complexity and expenditure, both operational and capital, associated with the equipment, personnel and processes required to produce and maintain carbon dioxide as a liquid at such temperature conditions and at ambient pressure conditions. In an offshore scenario, limited space also means that it may not be viable to provide the necessary infrastructure to produce liquefied carbon dioxide at ambient pressure conditions.

Thus, it is thought to be particularly advantageous (though optional) in the context of the invention of the first aspect to liquefy carbon dioxide at ambient temperature conditions, and to store in the first set of storage pipes and/or transport the carbon dioxide as a liquid at ambient temperature conditions. As noted above, this requires the carbon dioxide to be pressurised at pressure conditions well above ambient conditions; however the pressurisation required is associated with significantly reduced complexity and expenditure, both operational and capital, in terms of the equipment, personnel and processes involved and hence is particularly suited to offshore scenarios.

Ambient temperature conditions may be any temperature between 0-25° C. As such, the pressure required in order to liquefy the carbon dioxide may be between 34 barg-45 barg, with the exact pressure required being determined by the specific ambient temperature.

Transporting the stored carbon dioxide away from the hydrocarbon production system for permanent storage may comprise transporting the carbon dioxide within a second set of storage pipes away from the hydrocarbon production system for permanent storage.

The term 'storage pipe' as used herein refers to a storage container formed from a length of pipe, which has been closed at each end, optionally by a hemispherical cap or dome that has, for example, been welded to the end of the pipe. Accordingly, the storage pipes are highly elongate, typically having a length-to-diameter ratio of at least 20.

The use of storage pipes as compared to, e.g., conventional tank storage (i.e. vessel storage) as the basis of transportation is advantageous since it is associated with a significantly lower capital and operational expenditure, particularly in the optional context of transporting liquid carbon dioxide at elevated pressures and ambient temperature conditions as discussed above and in further detail below.

As discussed above, typical 'tank' type storage solutions require thick steel walled tanks. These tanks are expensive to provide (given the large amount of material typically required), and are also expensive to transport given their weight (again, given the large amount of material required). The requisite wall thickness (and hence weight of the tank) also limits the size of the tank that can be used, meaning that the volume of carbon dioxide stored therein is limited.

In contrast, pipe storage is relatively inexpensive to provide because standard, 'off'-the-shelf pipes may be used to manufacture them. Moreover, for a given volume of storage, pipe storage can have a comparatively smaller wall thickness. Thus, a given volume of carbon dioxide can be stored using a comparatively lower total weight of storage tank material using pipe storage and can be achieved at a lower capital expenditure. Thus, pipe storage for transportation is a more viable solution as compared to conventional prior art solutions.

Each pipe used in each of the first and/or second sets of storage pipes may have a nominal diameter of between 40-60 inches (1.0 m-1.5 m). Preferably, each pipe may have a nominal size of 42 inches (1.1 m) or 56 inches (1.4 m), or may have any nominal size in the range of 42 inches (1.1 m) to 56 inches (1.4 m).

A vessel having a nominal diameter greater than about 56-60 inches (1.4 m-1.5 m) would typically be considered by the skilled person as a conventional tank (or pressure vessel) that is distinct from a pipe. This consideration is also true in the context of the current application, whereby any vessel having a nominal diameter of greater than about 56-60 inches (1.4 m-1.5 m) would not be considered as a pipe.

Each pipe used may be an X52, X56, X60, X65, X70 or X80 pipe in accordance with the API SPEC 5L specification.

As noted above, the storage pipes are highly elongate. Accordingly, each storage pipe of the first and/or second sets may have a length of between 10 m to 30 m, for example 12 m, 24 m or 26 m.

The storage pipes of the first and/or second sets may be formed from rolled pipes with, optionally, a single longitudinal seam. Such pipes are commonly available as 'off'-the-shelf type components and are typically inexpensive.

The storage pipes of the first and/or second sets may be configured for storing carbon dioxide at an elevated pressure, for example liquefied carbon dioxide at ambient temperature conditions. The storage pipes may be configured to store the carbon dioxide at between 34 barg-45 barg. The exact pressurised conditions that the storage pipes are configured to store the carbon dioxide at may be selected dependent on the ambient temperature of the carbon dioxide (optionally as a liquid) to be stored therein, the tolerances of the storage pipe and/or the tolerance of the equipment used for loading and unloading the carbon dioxide into the storage pipes.

A set of storage pipes may be considered as a plurality of storage pipes. That is, the first set of storage pipes may be considered as a first plurality of storage pipes. Equally, the second set of storage pipes may be considered a second plurality of storage pipes.

The first and/or second set of storage pipes may (each) comprise two or more storage pipes. Optionally, the first and/or second set of storage pipes may (each) comprise tens (i.e. 10-99), hundreds (i.e. 100-999), thousands (1000-9999) or even tens of thousands (10,000-99,999) of storage pipes It is in fact seen to be particularly beneficial, but optional, to store liquefied carbon dioxide at ambient temperature conditions in the first set of storage pipes at the hydrocarbon production system. Similarly, it is seen to be particularly beneficial, but optional, to transport liquefied carbon dioxide at ambient temperature conditions within a second set of storage pipes away from the hydrocarbon production system, for permanent storage. This is because the use of storage pipes offers a cheap, sample and technically non-challenging means for handling liquid carbon dioxide at ambient temperature conditions that is superior to other storage solutions.

The step of capturing carbon dioxide exhausted from the gas turbine engine may comprise capturing the carbon dioxide in an absorption liquid, optionally in an absorber/contactor in the form of, e.g., a column. The absorption liquid may be an amine solution.

After capturing the carbon dioxide in the absorption liquid, the step of capturing carbon dioxide exhausted from the gas turbine engine may comprise stripping/regenerating/desorbing the absorption liquid to remove the carbon dioxide therefrom. The stripping/regenerating/desorbing may be carried out in a stripper/regenerator/desorber in the form of, e.g., a column.

After stripping/regenerating/desorbing, the step of capturing carbon dioxide exhausted from the gas turbine engine may comprise compressing the carbon dioxide and/or condensation drying of the carbon dioxide. Collectively or individually, these steps may comprise the step of liquefying the carbon dioxide as discussed above.

After stripping/regenerating/desorbing, the method may comprise reusing the absorption liquid for capturing further carbon dioxide exhausted from the gas turbine engine.

One, several or all of the steps of stripping/regenerating/desorbing, compressing, condensation drying and/or storing the captured carbon dioxide in the first set of storage pipes may take place on a single, modular unit of the hydrocarbon production system. This unit may be termed a desorber and carbon handling unit where at least the steps of stripping/regenerating/desorbing and storing the carbon dioxide take place thereon.

The step of capturing the carbon dioxide in an absorption liquid may also take place on the single modular unit.

The single modular unit may be separate from the remainder of the hydrocarbon production system. For instance, this unit may be a separate facility from the portion of the hydrocarbon production system where the step of combusting produced hydrocarbon gas in the gas turbine engine and/or capturing the carbon dioxide in an absorption liquid take place. In an offshore scenario, the separate modular unit may be a separate floating unit/facility situated adjacent, e.g., a production platform. Having a separate, modular unit is advantageous since it can be easily installed/retrofitted with an already existing hydrocarbon production system in order that the invention of the first aspect can be implemented and without significant downtime in production at the already existent hydrocarbon production system. This also means that little to no modification is required to the already existing hydrocarbon production system, for the invention to be employed (other than perhaps introduction of means (e.g. an absorber column) for capturing the carbon dioxide from the exhaust fumes of the gas turbine).

In a second aspect of the invention, there is provided a hydrocarbon production system, the hydrocarbon production system comprising: a gas turbine engine configured to combust hydrocarbon gas produced at the hydrocarbon production system and to provide power for the hydrocarbon production system as a result of the combustion; means for capturing carbon dioxide exhausted from the gas turbine engine as a result of the combustion of the hydrocarbon gas; a first set of storage pipes for storing the captured carbon dioxide at the hydrocarbon production system; and means for offloading the stored carbon dioxide to a transportation vehicle configured for transporting the stored carbon dioxide away from the hydrocarbon production system for permanent storage.

The means for capturing carbon dioxide exhausted from the gas turbine engine may be or comprise a carbon dioxide capture apparatus and/or device.

The means for offloading the stored carbon dioxide to a transportation vessel may be or comprise a carbon dioxide offloading apparatus and/or device.

The method of the first aspect of the invention, including any optional features thereof, may be a method of operating the hydrocarbon production system of the second aspect of the invention.

The means for offloading the stored carbon dioxide to a transportation vehicle transportation may be or comprise means for offloading carbon dioxide to a transportation vessel and/or tanker, optionally a transportation vessel in accordance with that discussed in relation to the first aspect of the invention.

The hydrocarbon production system of the second aspect may be in accordance with the hydrocarbon production system discussed above in relation to the first aspect of the invention and may comprise any optional features thereof.

In a third aspect there is provided a combination comprising the hydrocarbon production system of the second aspect, optionally inclusive of any optional feature thereof, and a transportation vehicle configured for transporting the stored carbon dioxide away from the hydrocarbon production system for permanent storage.

The combination of the third aspect of the invention may be configured to carry out the method of the first aspect of the invention, optionally inclusive of any optional features thereof.

The transportation vehicle of the third aspect may be a transportation vessel and/or tanker. The transportation vessel may be in accordance with the transportation vessel described above in connection with the first aspect of the invention.

In a fourth aspect of the invention, there is provided a method of retrofitting an existing hydrocarbon production system, the existing hydrocarbon production system comprising a gas turbine engine configured to combust hydrocarbon gas produced at the hydrocarbon production system and to provide power for the hydrocarbon production system as a result of the combustion, the method comprises: installing means for capturing carbon dioxide exhausted from the gas turbine engine as a result of the combustion of the hydrocarbon gas; installing a first set of storage pipes for storing the captured carbon dioxide at the hydrocarbon production system; and installing means for offloading the stored carbon dioxide to a transportation vehicle configured for transporting the stored carbon dioxide away from the hydrocarbon production system for permanent storage.

The hydrocarbon production system resulting from the method of the fourth aspect may be the hydrocarbon production system of the second aspect, optionally inclusive of any optional feature thereof.

The means for capturing carbon dioxide exhausted from the gas turbine engine may be a carbon dioxide capture apparatus/device.

The means for offloading the stored carbon dioxide to a transportation vessel may be a carbon dioxide offloading apparatus/device.

In a fifth aspect of the invention, there is provided method of operating a hydrocarbon production system, the hydrocarbon production system comprising a gas turbine engine configured to combust hydrocarbon gas produced at the hydrocarbon production system and to provide power for the hydrocarbon production system as a result of the combustion, the method comprising: combusting produced hydrocarbon gas in the gas turbine engine; capturing carbon dioxide exhausted from the gas turbine engine as a result of the combustion of the hydrocarbon gas; liquefying the captured carbon dioxide at ambient temperature conditions; and transporting the liquefied carbon dioxide at ambient temperature conditions away from the hydrocarbon production system for permanent storage. A correspondent hydrocarbon production system is also provided in a sixth aspect of the invention, as is a combination comprising said hydrocarbon production system and a transportation vehicle in a seventh aspect of the invention, and a method of retrofitting an existing hydrocarbon production system for conformity with said hydrocarbon production system in an eighth aspect of the invention.

The fifth to eighth aspects of the invention may be in accordance with any compatible features of the first to fourth aspects of the invention discussed above, including any optional features thereof.

BRIEF DESCRIPTION OF THE DRAWINGS

Certain embodiments of the invention will now be described, by way of example only, and with reference to the accompanying drawings, in which.

DETAILED DESCRIPTION

Figure 1:
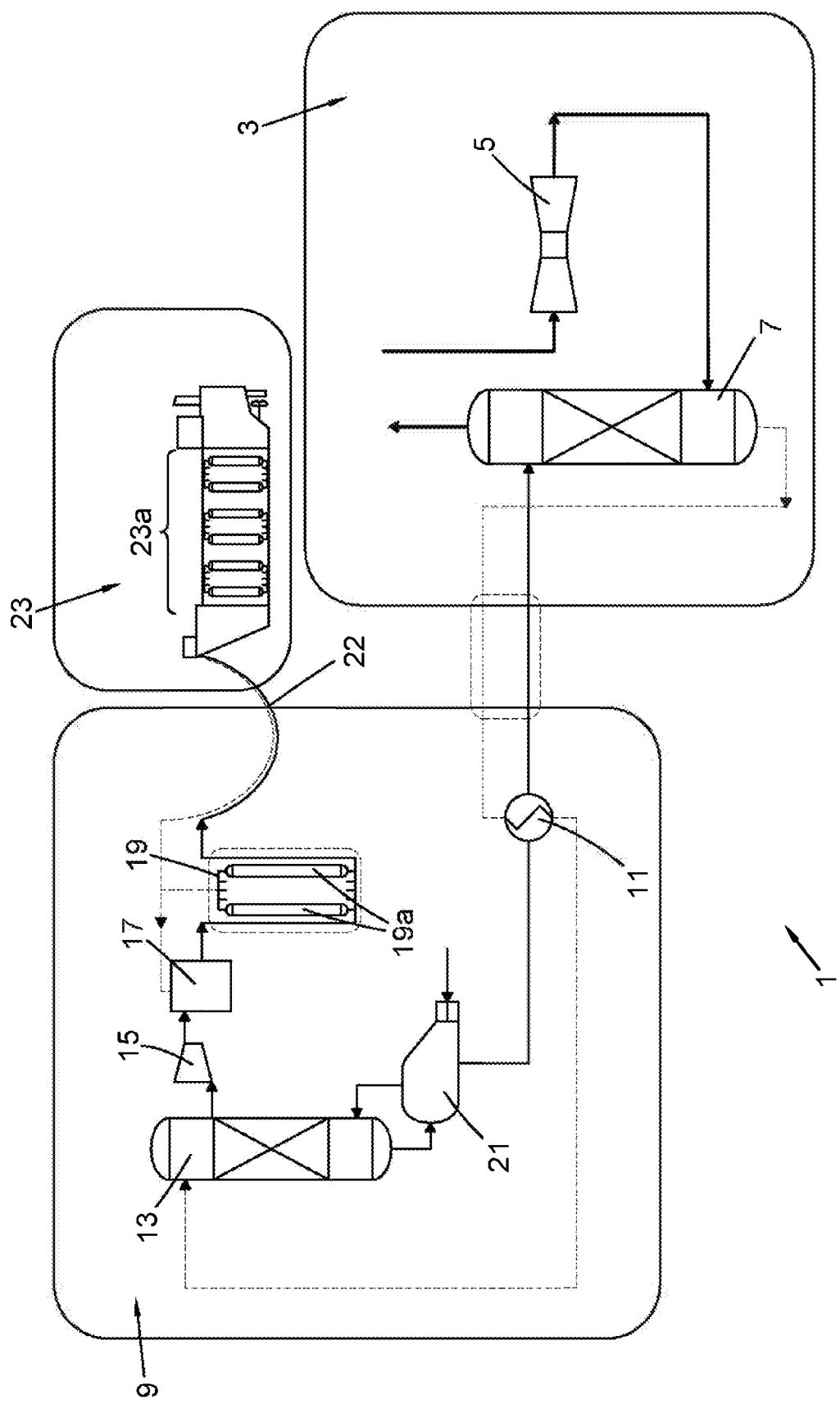
FIG. 1 depicts a hydrocarbon production system and a transportation vessel.

FIG. 1 shows an offshore hydrocarbon production system 1 comprising an offshore hydrocarbon production facility in the form of an offshore production platform 3 and a further facility in the form of a floating desorber and carbon handling unit 9 situated proximate to but separate from the offshore production platform 3. The hydrocarbon production system 1, via the desorber and carbon handling unit 9, is connected to a transportation vessel (tanker) 23 via a conduit 22.

The hydrocarbon production system 1 is configured for producing hydrocarbons via suitable production equipment (not shown) situated at the production platform 3. Also situated at the platform 3 is a gas turbine engine 5. The gas turbine engine 5 is configured to receive a portion of the gas hydrocarbon product produced at the production platform 3 and to combust it therein in order to provide power for the functioning of at least the production platform 3 and optionally the entire hydrocarbon production system 1.

Further situated on the production platform 3 is an absorber column 7. The absorber column 7 is connected to an exhaust of the gas turbine engine 5 and is configured to receive the gases, and in particular the carbon dioxide, exhausted therefrom. The absorber column 7 has an absorption liquid in the form of an amine solution passing therethrough. The absorption liquid is configured to absorb carbon dioxide from the exhaust fumes received from the gas turbine engine 5.

On the floating desorber and carbon handling unit 9 there is situated a cross heat exchanger 11. The cross heat exchanger 11 is connected to the absorber column 7 on the production platform 3 via suitable conduits passing between the production platform 3 and the desorber and carbon handling unit 9. The cross exchanger 11 is configured to receive and have pass therethrough absorption liquid comprising absorbed carbon dioxide received from the absorber column 7. The cross heat exchanger 11 is further connected to an output of a reboiler 21 such that absorption liquid received therefrom and having carbon dioxide removed is configured to pass through the cross heat exchanger 11. An output of the cross heat exchanger 11 is connected to an input of the absorber column 7 via suitable conduits passing between the desorber and carbon handling unit 9 and the production platform 3. As such, absorption liquid having carbon dioxide removed therefrom and which has been received from the reboiler 21 is permitted to pass back to the absorber column 7 for further absorption thereat.

The configuration of the cross heat exchanger 11 permits thermal exchange between the carbon dioxide rich absorption liquid passing from the platform 3 to the desorber and carbon handling unit 9 and the carbon dioxide lean absorption liquid passing from the desorber and carbon handling unit 9 and the platform 3 as described further below.

Additionally provided on the desorber and carbon handling unit 9 is a desorber column 13. The desorber column 13 is connected to an output of the cross heat exchanger 11 and is configured to receive carbon dioxide rich absorption liquid therefrom. Once received, the desorber column 13 is configured to strip the carbon dioxide absorbed within the received absorption liquid so as to isolate the carbon dioxide therefrom.

A compressor 15 is further situated on the desorber and carbon handling unit 9 and is connected to an output of the desorber column 13. The compressor 15 is configured to receive the isolated carbon dioxide from the desorber column 13 and to pressurise/compress the received carbon dioxide at ambient temperature conditions sufficiently in order to liquefy the carbon dioxide.

A condensation drying unit 17 is connected to an output of the compressor 15 and is configured to receive compressed liquid carbon dioxide therefrom. The condensation drying unit 17 is configured to condense any carbon dioxide that may have vaporised after output from the compressor 15 such that the liquid state of the carbon dioxide is maintained.

An output of the condensation drying unit 17 is connected to a storage means 19 on the desorber and carbon handling unit 9. The storage means comprises a plurality of storage pipes 19a. The storage pipes 19a are configured to store the liquid carbon dioxide received from the condensation drying unit 17 at ambient temperature conditions and suitable pressurised conditions to maintain the carbon dioxide as a liquid. Whilst in FIG. 1 only two such storage pipes 19a are shown, this is schematic and in practice there may be several tens, hundreds or even thousands of such storage pipes 19a at the desorber and carbon handling unit 9 depending on the volume of carbon dioxide that is required to be stored.

Figure 2:
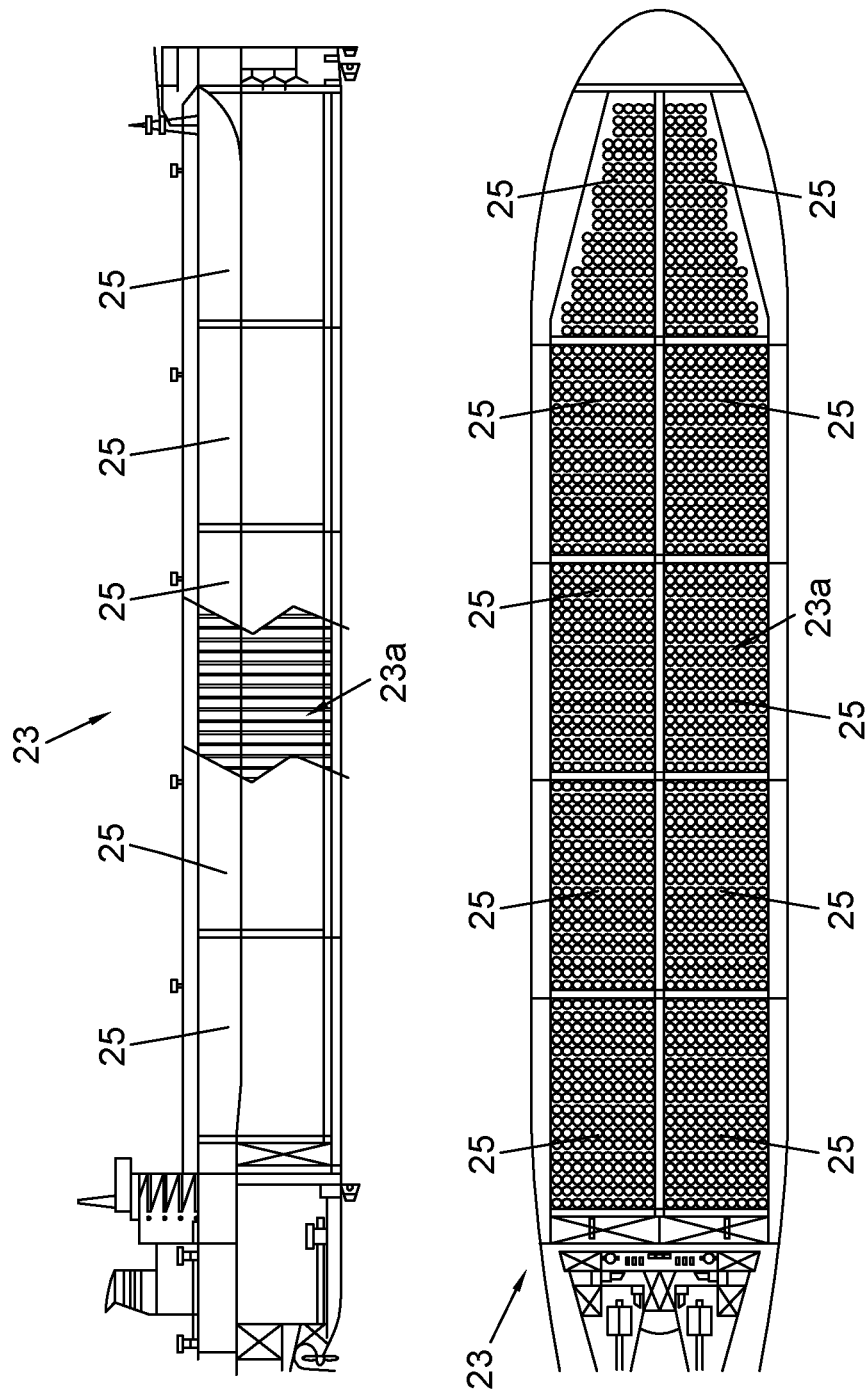
FIG. 2 is a part-cutaway profile view and cutaway plan view of the transportation vessel of FIG. 1.

A first end of the conduit 22 is attached to an output of the storage means 19 and a second end of the conduit 22 is attachable to an inlet of a tanker 23 as shown in FIG. 1. The conduit permits liquid carbon dioxide from the storage pipes 19a to be transferred to the storage pipes 23a on the tanker 23 for subsequent transportation. In FIG. 1 only six such storage pipes 23a are shown on the tanker 23, however this is schematic and in practice there may be several tens, hundreds or even thousands of such storage pipes 19a at the desorber and carbon handling unit 9. An example of this is shown in FIG. 2. FIG. 2 shows an embodiment of the tanker 23 comprising thousands of such storage pipes 23a positioned in several cargo holds 25 on the tanker 23.

Connected to a second output of the desorber column 13 is a reboiler 21. The reboiler 21 is configured to receive the absorption liquid that has had carbon dioxide stripped therefrom (i.e. carbon dioxide lean absorption liquid) from the desorber column 13. Once received therein, the reboiler 21 is configured to vaporise a portion of the absorption liquid. This vaporised absorption liquid is then configured to be returned back to the desorber column 13 which introduces the necessary thermal energy into the desorber column 13 to permit the carbon dioxide being stripped from the absorption liquid. The portion of the absorption liquid that is not vaporised in the reboiler is configured to be passed through the cross heat exchanger 11 and back to the absorption column 7 on the platform 3.

In use, hydrocarbons are produced at the production platform 3 of the hydrocarbon production system 1 via its production equipment. A portion of the hydrocarbons produced comprise a gas product and at least a portion of this gas product is sent to the gas turbine engine 5 for combustion thereat. This combustion provides power for the production platform 3 and, optionally, the entirety of the hydrocarbon production system 1.

The exhaust gases, in particular exhausted carbon dioxide, produced from the combustion at the gas turbine engine 5 are transferred to the absorber column 7. At the absorber column 7 the carbon dioxide is absorbed into the absorption liquid passing through the column 7. The remaining gas (i.e. after carbon dioxide has been removed) is then vented to the atmosphere from the absorber column 7.

The absorption liquid after having absorbed carbon dioxide (i.e. carbon dioxide rich absorption liquid) is transferred from the absorber column 7 on the production platform 3 to the cross heat exchanger 11 on the carbon handling and desorber unit 9. Thereat, heat exchange occurs between the carbon dioxide rich absorption liquid and the carbon dioxide lean absorption liquid received from the reboiler 21.

From the cross heat exchanger 11 the carbon dioxide rich absorption liquid is passed to the desorber column 13 where carbon dioxide is stripped from the absorption liquid. The stripped carbon dioxide is then passed to the compressor 15 where it is pressurised and thereby liquefied at temperature conditions. This ambient temperature liquid carbon dioxide is then passed, via the condensation drying unit 17, to the storage pipes 19a for interim storage thereat as an ambient temperature liquid.

The absorption liquid stripped of carbon dioxide is passed from the desorber column 13 to the reboiler 21. A portion of the absorption liquid is vaporised at the reboiler 21 and then passed back to the desorber column 13. The remaining liquid portion of the carbon dioxide lean absorption liquid is passed through the cross heat exchanger 11 where it undergoes thermal exchange with the carbon dioxide rich absorption liquid. From the cross heat exchanger 11, the carbon dioxide lean absorption liquid is passed back to the absorber column 7 on the production platform 3 such that the cycle of carbon dioxide capture and storage can begin again.

Intermittently, once there is sufficient liquid carbon dioxide stored in the storage pipes 19a to warrant it, a tanker 23 having storage pipes 23a thereon will travel to the site of the hydrocarbon production system 1, specifically the site of the desorber and carbon handling unit 9. The second end of the conduit 22 is then attached to an inlet of the tanker 23 once it has arrive at the site of the desorber and carbon handling unit 9. At this stage, ambient temperature liquid carbon dioxide is offloaded from the storage pipes 19a to the tanker 23 to be stored in the storage pipes 23a thereon via the conduit 22.

During the offloading process, part of carbon dioxide may vaporise. Any vaporised carbon dioxide received at the tanker 23 is passed back to the condensation drying unit 17 via suitable conduits, where it is condensed and subsequently returned to the storage pipes 19a for later loading onto a vessel 23.

After the storage pipes 23a have been filled on the tanker 23, the tanker 23 is disconnected from the conduit 22. The tanker 23 then transports the liquid carbon dioxide away from the hydrocarbon production system for permanent storage.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

We claim:

1. A method of operating a hydrocarbon production system, the hydrocarbon production system comprising a gas turbine engine configured to combust hydrocarbon gas produced at the hydrocarbon production system and to provide power for the hydrocarbon production system as a result of the combustion, the method comprising:
    combusting produced hydrocarbon gas in the gas turbine engine;
    capturing carbon dioxide exhausted from the gas turbine engine as a result of the combustion of the hydrocarbon gas;
    storing captured carbon dioxide as liquid at ambient temperature at the hydrocarbon production system in a first set of storage pipes; and
    transporting stored carbon dioxide away from the hydrocarbon production system for permanent storage.

2. A method as claimed in claim 1, wherein the hydrocarbon production system is an offshore hydrocarbon production system.

3. A method as claimed in claim 2, wherein transporting the stored carbon dioxide away from the hydrocarbon production system comprises use of a vessel and/or a tanker.

4. A method as claimed in claim 1, comprising, subsequent to or as part of the step of capturing carbon dioxide, liquefying the captured carbon dioxide such that the carbon dioxide is a liquid.

5. A method as claimed in claim 4, wherein liquefying the captured carbon dioxide comprises liquefying the captured carbon dioxide at ambient temperature conditions such that the carbon dioxide is a liquid at ambient temperature conditions.

6. A method as claimed in claim 4, wherein transporting the stored carbon dioxide away from the hydrocarbon production system for permanent storage comprises transporting the carbon dioxide as a liquid.

7. A method as claimed in claim 6, comprising transporting the carbon dioxide as a liquid at ambient temperature conditions.

8. A method as claimed in claim 5, wherein ambient temperature conditions are conditions between 0° C.-25° C. and wherein the pressure required in order to liquefy and/or maintain the carbon dioxide as a liquid at ambient temperatures conditions is between 34 barg-45 barg, with the exact pressure required being determined by specific ambient temperature conditions.

9. A method as claimed in claim 1, wherein transporting the stored carbon dioxide away from the hydrocarbon production system for permanent storage comprises transporting the carbon dioxide within a second set of storage pipes away from the hydrocarbon production system for permanent storage.

10. A hydrocarbon production system, the hydrocarbon production system comprising:
    a gas turbine engine configured to combust hydrocarbon gas produced at the hydrocarbon production system and to provide power for the hydrocarbon production system as a result of the combustion;
    means for capturing carbon dioxide exhausted from the gas turbine engine as a result of the combustion of the hydrocarbon gas;
    a first set of storage pipes for storing captured carbon dioxide at the hydrocarbon production system, wherein the first set of storage pipes are configured to store the captured carbon dioxide as liquid at ambient temperature; and
    means for offloading stored carbon dioxide to a transportation vehicle configured for transporting the stored carbon dioxide away from the hydrocarbon production system for permanent storage.

11. A hydrocarbon production system as claimed in claim 10, wherein the hydrocarbon production system is offshore.

12. A hydrocarbon production system as claimed in claim 10, wherein the means for capturing the carbon dioxide comprises a contactor configured to absorb carbon dioxide into an absorption liquid and a desorber configured to strip the carbon dioxide from the absorption liquid.

13. A hydrocarbon production system as claimed in claim 12, wherein the desorber, the first set of storage pipes and the means for offloading the stored carbon dioxide to a transportation vehicle or pipeline are provided on a single, modular unit that is separate from the rest of the hydrocarbon production system.

14. A hydrocarbon production system as claimed in claim 10, comprising, either as part of or separate to the means for capturing carbon dioxide, means for liquefying the captured carbon dioxide.

15. A hydrocarbon production system as claimed in claim 14, wherein the means for liquefying the captured carbon dioxide are configured for liquefying the captured carbon dioxide at ambient temperature conditions.

16. A hydrocarbon production system as claimed in claim 14, wherein the means for offloading the stored carbon dioxide to a transportation vehicle is configured to offload liquid carbon dioxide at ambient temperature conditions.

17. A hydrocarbon production system as claimed in claim 10, wherein the means for offloading the stored carbon dioxide to a transportation vehicle comprises means for offloading the stored carbon dioxide to a transportation vessel.

18. A combination comprising the hydrocarbon production system as claimed in claim 10, and a transportation vehicle configured for transporting the stored carbon dioxide away from the hydrocarbon production system for permanent storage.

19. A combination as claimed in claim 18, wherein the transportation vehicle comprises a second set of storage pipes for storing carbon dioxide therein.

20. A combination as claimed in claim 19, wherein the second set of storage pipes are configured for storing carbon dioxide as a liquid at ambient temperature conditions.

21. A combination as claimed in claim 18, wherein the transportation vehicle is a transportation vessel.

22. A method of retrofitting an existing hydrocarbon production system, the existing hydrocarbon production system comprising a gas turbine engine configured to combust hydrocarbon gas produced at the hydrocarbon production system and to provide power for the hydrocarbon production system as a result of the combustion, the method comprises:
  installing means for capturing carbon dioxide exhausted from the gas turbine engine as a result of the combustion of the hydrocarbon gas;
  installing a first set of storage pipes for storing captured carbon dioxide at the hydrocarbon production system, wherein the first set of storage pipes are configured to store the captured carbon dioxide as liquid at ambient temperature; and
  installing means for offloading stored carbon dioxide to a transportation vehicle configured for transporting the stored carbon dioxide away from the hydrocarbon production system for permanent storage.

\* \* \* \* \*